United States Patent
Schmalzried et al.

(10) Patent No.: US 10,580,311 B2
(45) Date of Patent: Mar. 3, 2020

(54) UAV GROUP CHARGING BASED ON DEMAND FOR UAV SERVICE

(71) Applicant: Wing Aviation LLC, Mountain View, CA (US)

(72) Inventors: Jim Schmalzried, San Jose, CA (US); Jesse Blake, Sunnyvale, CA (US)

(73) Assignee: Wing Aviation LLC, Mountain View, CA (US)

( * ) Notice: Subject to any disclaimer, the term of this patent is extended or adjusted under 35 U.S.C. 154(b) by 0 days.

(21) Appl. No.: 15/794,925

(22) Filed: Oct. 26, 2017

(65) Prior Publication Data
US 2019/0126769 A1   May 2, 2019

(51) Int. Cl.
*H02J 7/00* (2006.01)
*G08G 5/00* (2006.01)
(Continued)

(52) U.S. Cl.
CPC ............ *G08G 5/0069* (2013.01); *B60L 53/36* (2019.02); *B60L 53/64* (2019.02); *B60L 53/65* (2019.02); *B60L 53/67* (2019.02); *B60L 53/68* (2019.02); *B60L 58/12* (2019.02); *B64C 39/024* (2013.01); *G05D 1/104* (2013.01); *G06Q 10/04* (2013.01); *G06Q 10/0631* (2013.01); *G06Q 10/06316* (2013.01); *G06Q 10/08* (2013.01);
(Continued)

(58) Field of Classification Search
CPC .................................................. B60L 11/1846
USPC ........................................................ 320/109
See application file for complete search history.

(56) References Cited

U.S. PATENT DOCUMENTS 8,912,753 B2 * 12/2014 Pudar ................. B60L 11/1816
                                                            320/109
9,148,027 B2    9/2015 Shane et al.
(Continued)

FOREIGN PATENT DOCUMENTS

| EP | 2717016 | 4/2014 |
|---|---|---|
| WO | 2016/140988 | 9/2016 |
| WO | 2016/210156 | 12/2016 |

OTHER PUBLICATIONS

International Searching Authority, International Search Report and Written Opinion dated Dec. 5, 2018, issued in connection with International Patent Application No. PCT/US2018/051039, filed Sep. 14, 2018, 13 pages.

*Primary Examiner* — Suresh Memula
(74) *Attorney, Agent, or Firm* — McDonnell Boehnen Hulbert & Berghoff LLP

(57) ABSTRACT

Example embodiments can help to more efficiently charge unmanned aerial vehicles (UAVs) in a plurality of UAVs that provide delivery services. An example method includes: determining demand data indicating demand for item-transport services by the plurality of UAVs during a period of time; determining battery state information for the plurality of UAVs, wherein the battery state information is based at least in part on individual battery state information for each of two or more of the UAVs; based at least in part on (a) the demand data for item-transport services by the plurality of UAVs, and (b) the battery state information for the fleet of UAVs, determining respective charge-rate profiles for one or more of the UAVs; and sending instructions to cause respective batteries of the one or more of the UAVs to be charged according to the respectively determined charge-rate profiles.

18 Claims, 8 Drawing Sheets

(51) Int. Cl.
- *B60L 53/65* (2019.01)
- *B60L 58/12* (2019.01)
- *G06Q 10/06* (2012.01)
- *B60L 53/36* (2019.01)
- *G06Q 10/08* (2012.01)
- *B60L 53/64* (2019.01)
- *G06Q 10/04* (2012.01)
- *B60L 53/68* (2019.01)
- *B60L 53/67* (2019.01)
- *B64C 39/02* (2006.01)
- *G05D 1/10* (2006.01)

(52) U.S. Cl.
CPC ......... *H02J 7/0027* (2013.01); *B60L 2200/10* (2013.01); *B60L 2200/40* (2013.01); *B60L 2230/16* (2013.01); *B60L 2240/622* (2013.01); *B60L 2240/72* (2013.01); *B60L 2260/32* (2013.01); *B64C 2201/042* (2013.01); *B64C 2201/128* (2013.01)

(56) References Cited

U.S. PATENT DOCUMENTS

| | | | |
|---|---|---|---|
| 9,197,091 | B2 | 11/2015 | Kishiyama et al. |
| 9,262,929 | B1 | 2/2016 | Roy et al. |
| 9,440,550 | B2 | 9/2016 | Jones |
| 10,042,359 | B1* | 8/2018 | Konrardy ............. G05D 1/0088 |
| 10,163,357 | B2* | 12/2018 | Venkatraman ........ B64C 39/024 |
| 2013/0307475 | A1* | 11/2013 | Kishiyama ............ H02J 7/0027 320/109 |
| 2015/0039391 | A1 | 2/2015 | Hershkovitz et al. |
| 2015/0165915 | A1 | 6/2015 | Cun |
| 2015/0239365 | A1 | 8/2015 | Hyde et al. |
| 2015/0314869 | A1* | 11/2015 | Lemus Martin ...... B64C 39/024 701/3 |
| 2016/0028263 | A1* | 1/2016 | Yau ....................... H02J 7/0021 320/107 |
| 2017/0136631 | A1* | 5/2017 | Li ........................... B25J 19/005 |
| 2017/0327091 | A1* | 11/2017 | Capizzo ................ H01M 10/42 |
| 2017/0344000 | A1* | 11/2017 | Krishnamoorthy ... B64C 39/024 |
| 2018/0016027 | A1* | 1/2018 | Cheatham, III ........ B64D 45/00 |
| 2018/0060776 | A1* | 3/2018 | Ahmed ................. G01C 21/343 |
| 2018/0081360 | A1* | 3/2018 | Bostick ................. G05D 1/0088 |
| 2018/0205242 | A1* | 7/2018 | Kelly-Morgan ...... H02J 7/0021 |

\* cited by examiner

UAV GROUP CHARGING BASED ON DEMAND FOR UAV SERVICE

BACKGROUND

An unmanned system, which may also be referred to as an autonomous vehicle, is a vehicle capable of travel without a physically-present human operator. An unmanned system may operate in a remote-control mode, in an autonomous mode, or in a partially autonomous mode.

When an unmanned system operates in a remote-control mode, a pilot or driver that is at a remote location can control the unmanned vehicle via commands that are sent to the unmanned vehicle via a wireless link. When the unmanned system operates in autonomous mode, the unmanned system typically moves based on pre-programmed navigation way-points, dynamic automation systems, or a combination of these. Further, some unmanned systems can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned systems exist for various different environments. For instance, unmanned aerial vehicles (UAVs) are configured for operation in the air (e.g., flight). Examples include quad-copters and tail-sitter UAVs, among others. Unmanned systems also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Example systems and methods relate to control systems that coordinate operation for a group of UAVs. In particular, such control systems may coordinate requests for item-transport services by the UAVs (e.g., orders and corresponding UAV deliveries). In this context, it may be beneficial for UAV operators to schedule UAV re-charging at times when off-peak electricity pricing is available (e.g. overnight) and/or in ways that will increase battery lifetime, such as charging more slowly and not re-charging batteries to 100% state of charge (SOC). However, such cost reduction practices may conflict with the need to provide reliable and timely UAV item-transport service. Accordingly, example embodiments may evaluate demand data for UAV item-transport services to take advantage of time periods where demand is low, by charging UAVs more slowly and/or not charging UAVs to 100% SoC. Conversely, when demand is higher, example methods may be utilized to charge some or all UAVs more rapidly so as to meet demand, but not more rapidly than necessary.

More generally, an example method involves a control system for a plurality of UAVs: (i) determining demand data indicating demand for item-transport services by the plurality of UAVs during a period of time; (ii) determining battery state information for the plurality of UAVs, wherein the battery state information is based at least in part on individual battery state information for each of two or more of the UAVs, (iii) based at least in part on (a) the demand data for item-transport services by the plurality of UAVs, and (b) the battery state information for the plurality of UAVs, determining respective charge-rate profiles for one or more of the UAVs; and (d) sending instructions to cause respective batteries of the one or more of the UAVs to be charged according to the respectively determined charge-rate profiles.

In another aspect, a control system for a plurality of UAVs includes: at least one communication interface for communicating with a plurality of charging hubs, wherein each charging hub is capable of charging two or more UAVs, and a computing system. The computing system is operable to: (i) determine UAV demand data indicating demand for item-transport services by the plurality of UAVs during a period of time; (ii) determine battery state information for the plurality of UAVs, wherein the battery state information is based at least in part on individual battery state information for each of two or more of the UAVs; (iii) based at least in part on (a) the demand data for item-transport services by the plurality of UAVs, and (b) the battery state information for the plurality of UAVs, determine a respective charge-rate profile for each of one or more of the UAVs; and (iv) send, via the at least one communication interface, instructions to at least one charging hub to cause respective batteries of the one or more of the UAVs to be charged according to the respectively determined charge-rate profiles.

These as well as other aspects, advantages, and alternatives, will become apparent to those of ordinary skill in the art by reading the following detailed description, with reference where appropriate to the accompanying drawings.

DETAILED DESCRIPTION

Figure 1A:
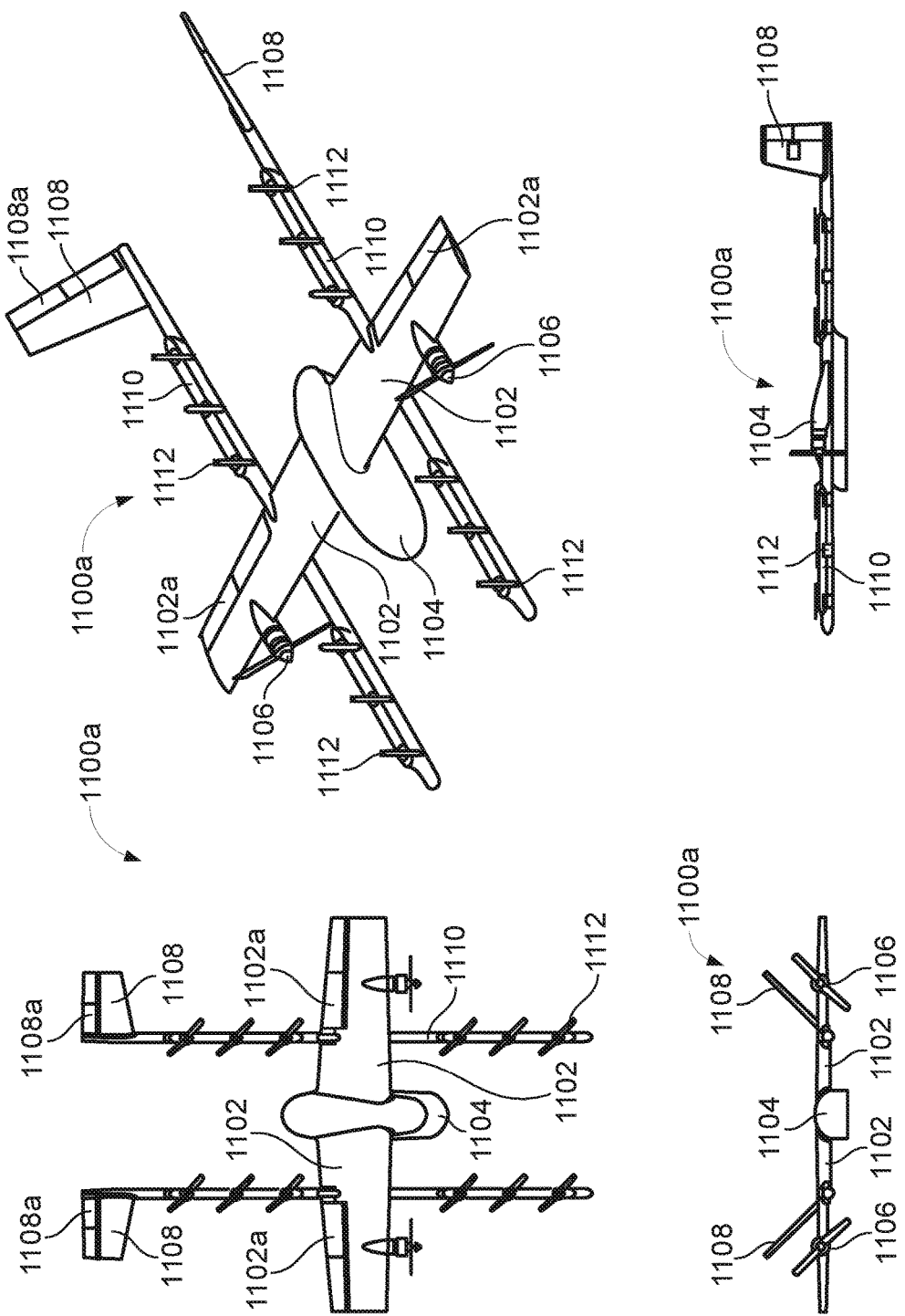
FIG. 1A is a simplified illustration of an unmanned aerial vehicle, according to example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. OVERVIEW

Example embodiments relate to a group of unmanned aerial vehicles (UAV) that may be operated by a UAV transport service provider to fulfill service requests for item-transport tasks involving flight. Throughout a given operational time period (e.g. a day), the demand for UAV flights can vary dynamically, and perhaps in unpredictable ways (e.g., in the case of a UAV based delivery service). At times of high demand, UAVs may be required to execute tasks (e.g., pick-up and/or delivery flights) more frequently. Further, in order to reduce operational costs, it is desirable to reduce the number of UAVs that are required to carry out a given number of tasks in a given amount of time. Thus, it is desirable to minimize the downtime required for UAVs to re-charge between flights, in order to increase the amount of operational time that UAVs can spend carrying out the desired tasks (e.g., delivering items) during a given time period.

However, the lifetime of a battery can be negatively affected by repeatedly charging a battery at a high charge (C) rate. Typically, battery manufacturers recommend a low charge rate (<0.8C, where C=capacity of battery in amphours) to maximize battery lifetime. Thus, while it is possible to "burst" charge at higher rates (e.g., 1-2C), it is important to consider the tradeoff between faster charge rates and reduced battery lifetime (and corresponding battery replacement costs).

Example embodiments can be implemented to adjust charge rates across a fleet of UAVs, in an effort to balance the need for rapid UAV delivery with the desire to preserve the useful lives of the UAVs' batteries. To do so, example embodiments may vary the charge rates for UAVs in a group of UAVs based on the demand for the delivery services by the group (and perhaps other factors as well). In particular, a central control system for a UAV fleet may consider a number of factors when adjusting UAV charge rates to more efficiently meet demand for UAV delivery services, such as infrastructure location (e.g., location of UAV charging stations), historical, known, and/or predicted levels of demand for UAV delivery service, electric grid availability and pricing, battery state of health/state of charge of individual UAV batteries, and/or temporary flight restrictions, among other possibilities.

For example, during the night, when demand for UAV delivery is lower, a charging control system could detect/predict the lower demand and instruct UAVs to charge more slowly, thus extending the useful life of the UAV's battery (e.g., the number of times the battery can be recharged before its fully-charged capacity is less than 80% of its original capacity). Conversely, peak delivery times could be predicted/detected, and some or all UAVs in the fleet could be instructed to use faster charging rate(s).

In example embodiments, there may be ground charging stations (also referred to herein as "charging hubs") distributed throughout an area served by a group of UAVs. Each ground charging station may be configured to charge one UAV or multiple UAVs concurrently. Further, each charging station may include ground equipment operable to communicate with a backend server (e.g., a control system for the group or for a certain geographic area where UAV transport services are provided). Configured as such, a central control system can receive location information, battery state information, and/or other data from UAVs. Additionally or alternatively, a charging hub could include equipment for direction communication with UAVs, via which the charging hub could obtain battery state information and/or other data from UAVs located at the charging hub. The charging hub could then relay information received from UAVs to the central control system. In either case, the central control system can use the battery state information, expected demand data, and possibly other information as well, to determine a more efficient (e.g., lower cost) way to charge UAVs in the group, while still meeting the demand for UAV services. The central control system can then send instructions for each UAV to the charging station where the UAV is located (or where the UAV is expected to arrive next), so that the charging station can adjust the charging rate used to charge the UAV's battery system.

II. ILLUSTRATIVE UNMANNED VEHICLES

Herein, the terms "unmanned aerial system" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial vehicle" (UAV) may also be used to refer to a UAV.

FIG. 1A is a simplified illustration providing various views of a UAV, according to an example embodiment. In particular, FIG. 1A shows an example of a fixed-wing UAV 1100*a*, which may also be referred to as an airplane, an aeroplane, a biplane, a glider, or a plane, among other possibilities. The fixed-wing UAV 1100*a*, as the name implies, has stationary wings 1102 that generate lift based on the wing shape and the vehicle's forward airspeed. For instance, the two wings 1102 may have an airfoil-shaped cross section to produce an aerodynamic force on the UAV 1100*a*.

As depicted, the fixed-wing UAV 1100*a* may include a wing body or fuselage 1104. The wing body 1104 may contain, for example, control electronics such as an inertial measurement unit (IMU) and/or an electronic speed controller, batteries, other sensors, and/or a payload, among other possibilities. The illustrative UAV 1100*a* may also include landing gear (not shown) to assist with controlled take-offs and landings. In other embodiments, other types of UAVs without landing gear are also possible.

The UAV 1100*a* further includes propulsion units 1106 positioned on the wings 1106 (or fuselage), which can each include a motor, shaft, and propeller, for propelling the UAV 1100*a*. Stabilizers 1108 (or fins) may also be attached to the UAV 1110*a* to stabilize the UAV's yaw (turn left or right) during flight. In some embodiments, the UAV 1100*a* may be also be configured to function as a glider. To do so, UAV 1100*a* may power off its motor, propulsion units, etc., and glide for a period of time. In the UAV 1100*a*, a pair of rotor supports 1110 extend beneath the wings 1106, and a plurality of rotors 1112 are attached rotor supports 1110. Rotors 1110 may be used during a hover mode wherein the UAV 1110*a* is descending to a delivery location, or ascending following a delivery. In the example UAV 1100*a*, stabilizers 1108 are shown attached to the rotor supports 1110.

During flight, the UAV 1100a may control the direction and/or speed of its movement by controlling its pitch, roll, yaw, and/or altitude. For example, the stabilizers 1108 may include one or more rudders 1108a for controlling the UAV's yaw, and the wings 1102 may include one or more elevators for controlling the UAV's pitch and/or one or more ailerons 1102a for controlling the UAV's roll. As another example, increasing or decreasing the speed of all the propellers simultaneously can result in the UAV 1100a increasing or decreasing its altitude, respectively.

Figure 1B:
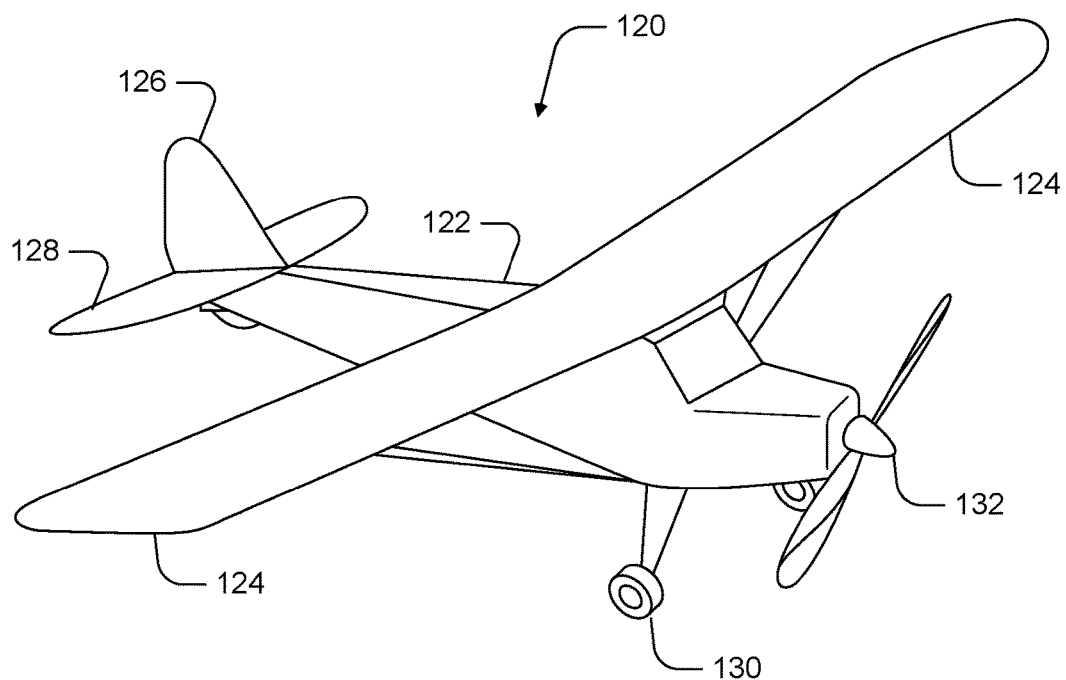
FIG. 1B is a simplified illustration of an unmanned aerial vehicle, according to example embodiments.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
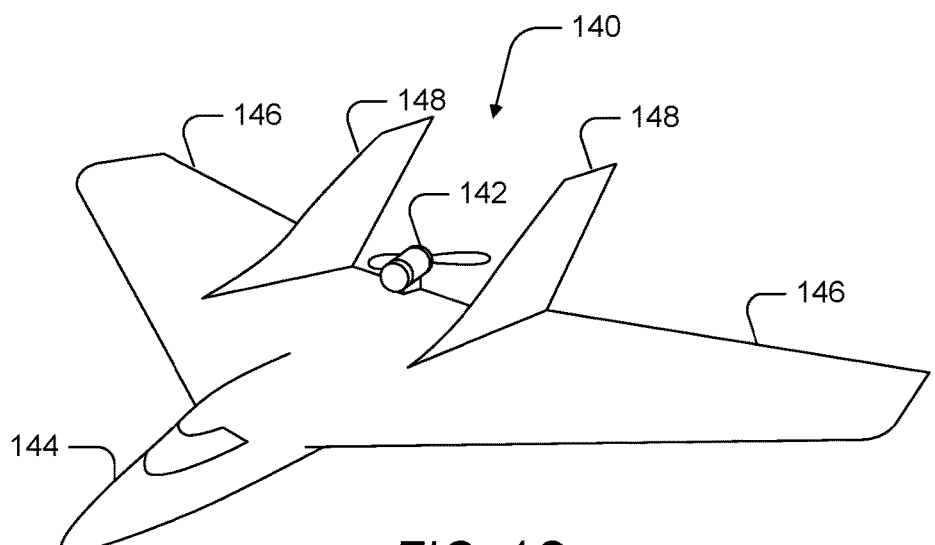
FIG. 1C is a simplified illustration of an unmanned aerial vehicle, according to example embodiments.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
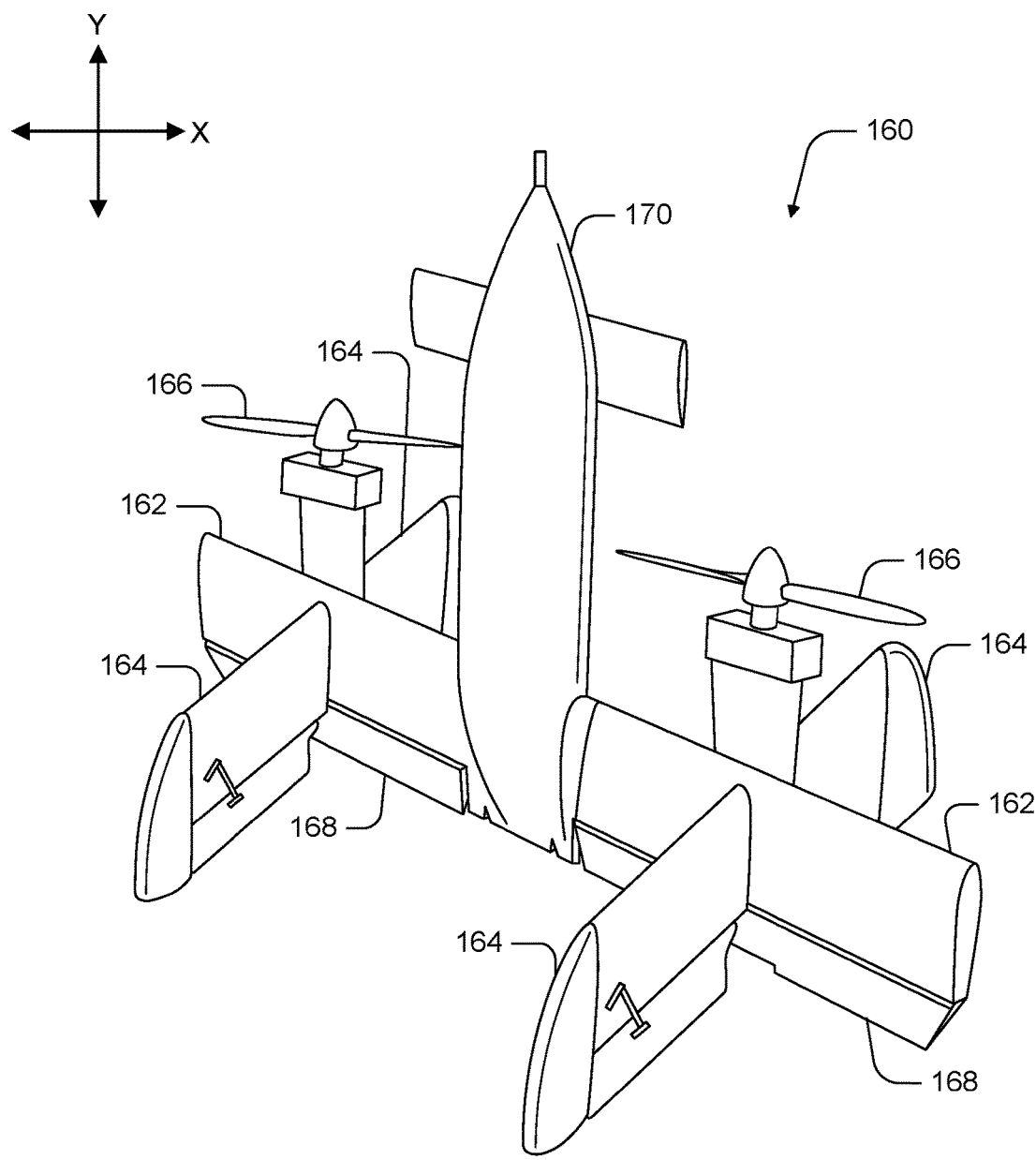
FIG. 1D is a simplified illustration of an unmanned aerial vehicle, according to example embodiments.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
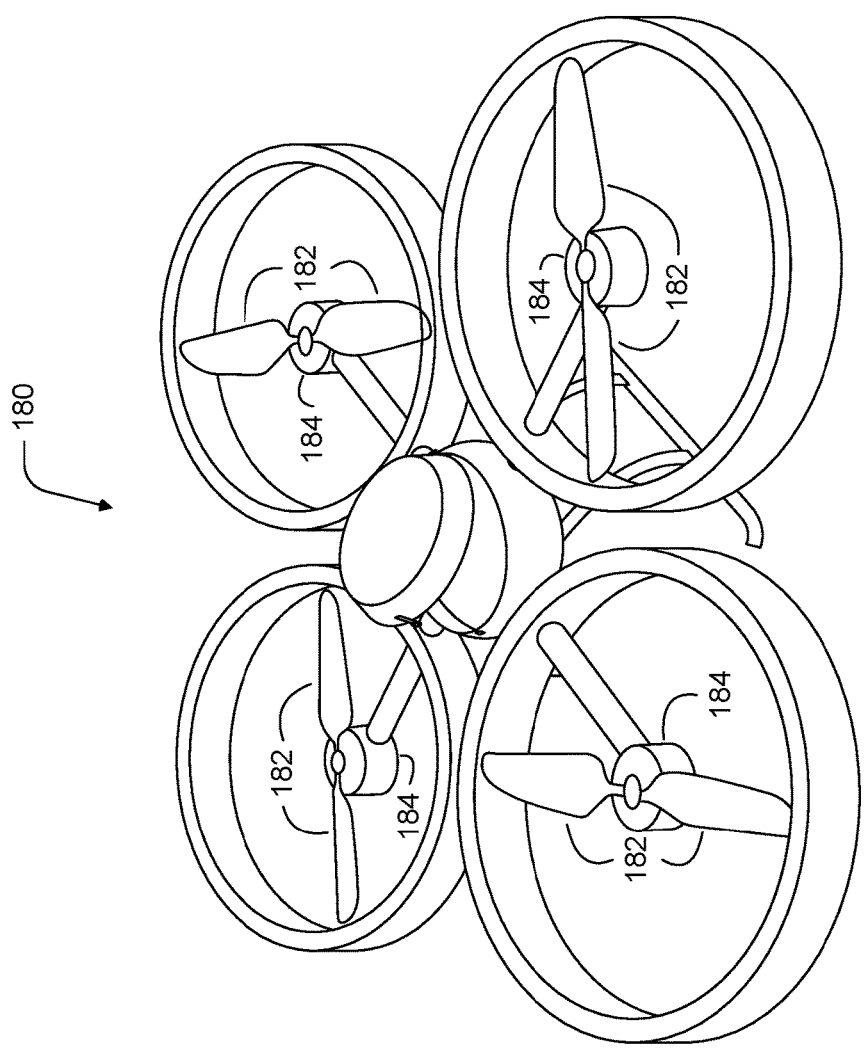
FIG. 1E is a simplified illustration of an unmanned aerial vehicle, according to example embodiments.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well.

Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. ILLUSTRATIVE UAV COMPONENTS

Figure 2:
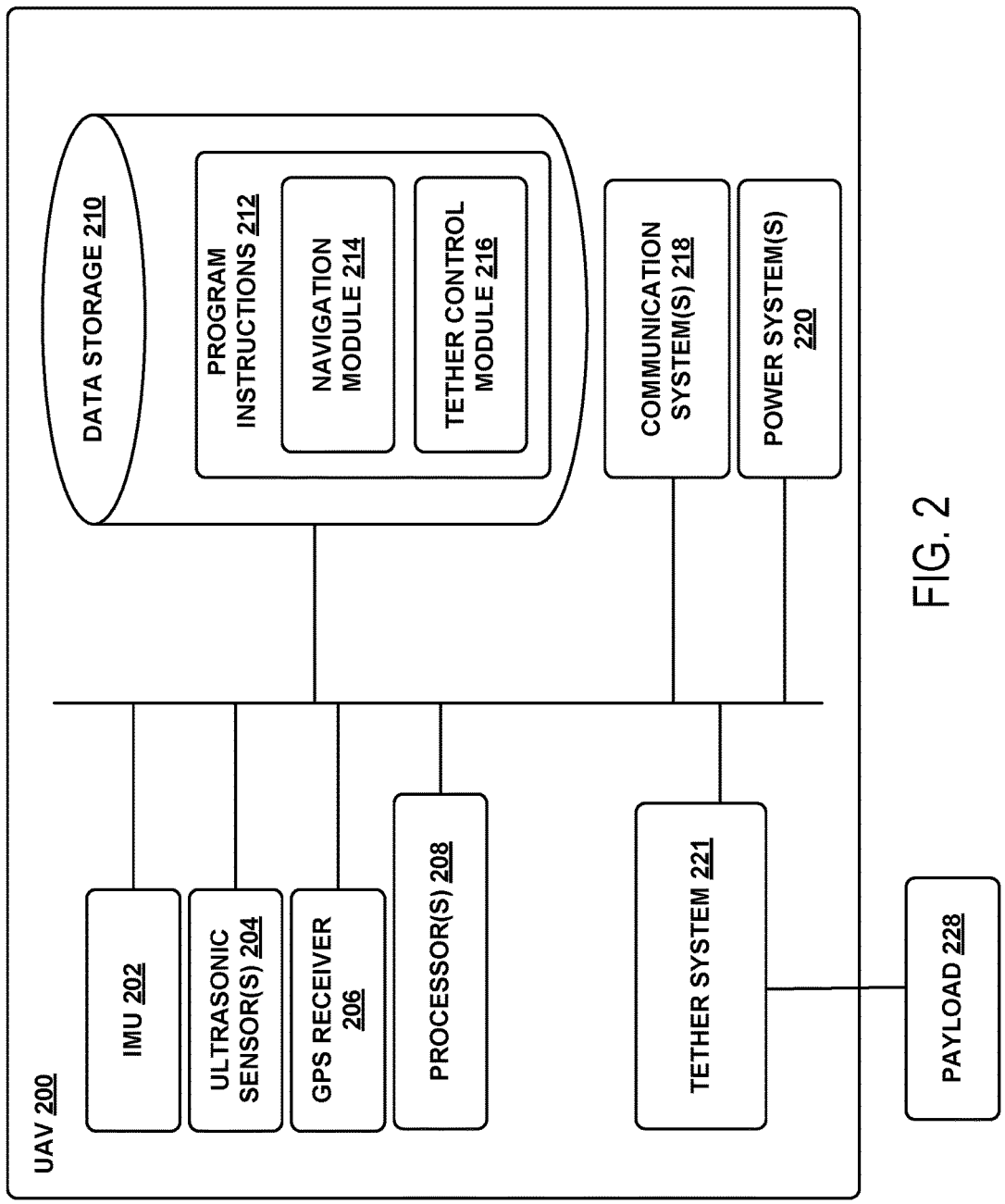
FIG. 2 is a simplified block diagram illustrating components of an unmanned aerial system, according to example embodiments.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine latitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a tether system 221, which may be controlled by the tether control module 216 in order to lower the payload 228 to the ground while the UAV hovers above. The tether system 221 may include a tether, which is couplable to a payload 228 (e.g., a package). The tether 224 may be wound on a spool that is coupled to a motor 222 of the UAV (although passive implementations, without a motor, are also possible). The motor may be a DC motor (e.g., a servo motor) that can be actively controlled by a speed controller, although other motor configurations are possible. In some embodiments, the tether control module 216 can control the speed controller to cause the 222 to rotate the spool, thereby unwinding or retracting the tether and lowering or raising the payload coupling apparatus. In practice, a speed controller may output a desired operating rate (e.g., a desired RPM) for the spool, which may correspond to the speed at which the tether system should lower the payload towards the ground. The motor may then rotate the spool so that it maintains the desired operating rate (or within some allowable range of operating rates).

In order to control the motor via a speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

In some embodiments, a payload coupling component (e.g., a hook or another type of coupling component) can be configured to secure the payload 228 while being lowered from the UAV by the tether. The coupling apparatus or component and can be further configured to release the payload 228 upon reaching ground level via electrical or electro-mechanical features of the coupling component. The payload coupling component can then be retracted to the UAV by reeling in the tether using the motor.

In some implementations, the payload 228 may be passively released once it is lowered to the ground. For example, a payload coupling component may provide a passive release mechanism, such as one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

In another implementation, a payload coupling component may include a hook feature that passively releases the payload when the payload contacts the ground. For example, the payload coupling component may take the form of or include a hook feature that is sized and shaped to interact with a corresponding attachment feature (e.g., a handle or hole) on a payload taking the form of a container or tote. The hook may be inserted into the handle or hole of the payload container, such that the weight of the payload keeps the payload container secured to the hook feature during flight. However, the hook feature and payload container may be designed such that when the container contacts the ground and is supported from below, the hook feature slides out of the container's attachment feature, thereby passively releasing the payload container. Other passive release configurations are also possible.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. ILLUSTRATIVE UAV DEPLOYMENT SYSTEMS

Figure 3:
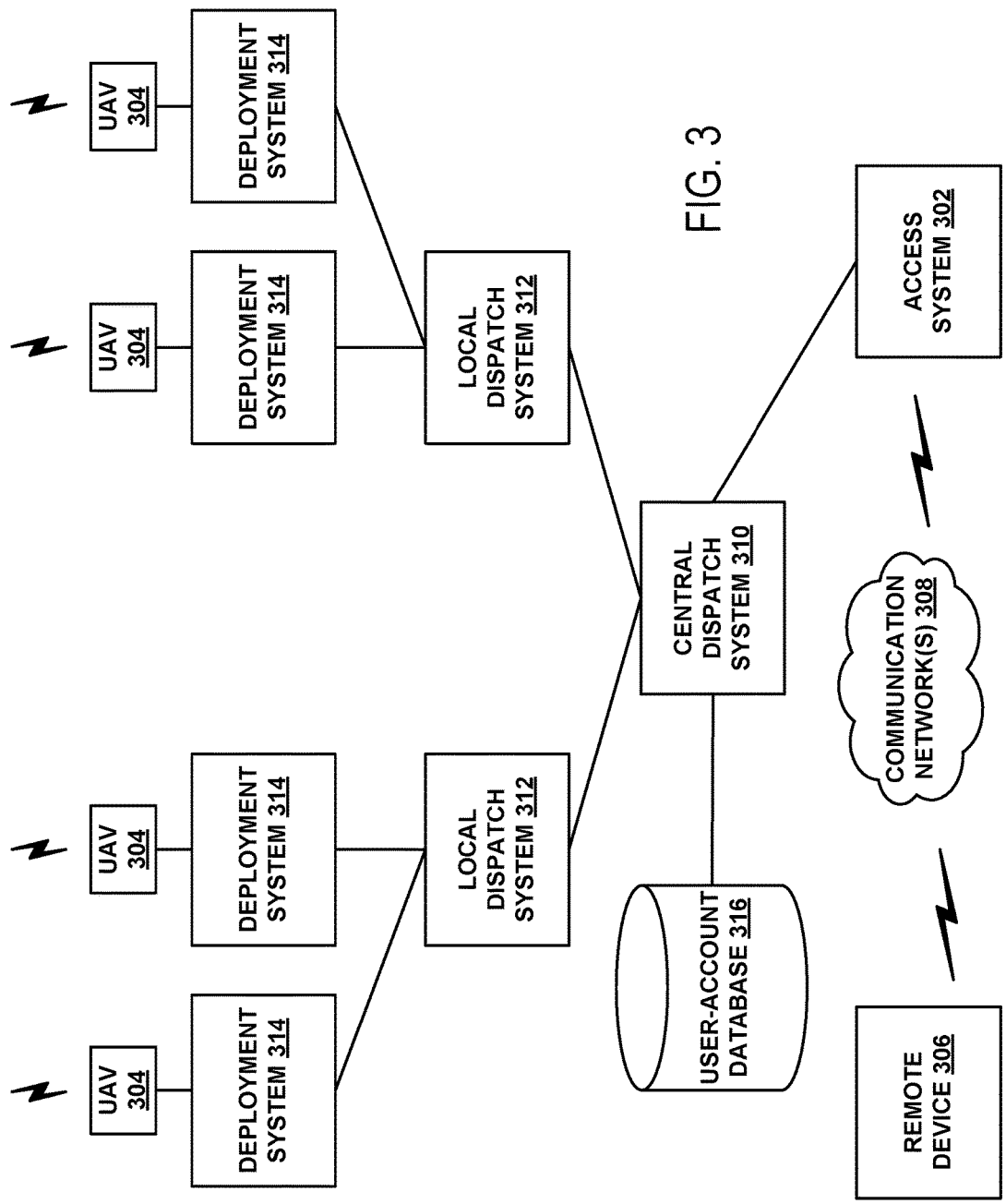
FIG. 3 is a simplified block diagram illustrating a distributed UAV system, according to example embodiments.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIG. 1, 2, 3, or 4. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch.

Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone to, e.g., place a call to an operator of the access system 302 or send a message requesting a UAV-related service to a dispatch system, the phone may be identified via a unique device identification number, and the call or message may then be attributed to the associated user account. Other examples are also possible.

V. ILLUSTRATIVE UAV TRANSPORT SYSTEM NETWORK

UAV delivery infrastructure, such as that shown in FIG. 3, may be configured to intelligently control functionality such as recharging and/or flight scheduling for a group of UAVs. For instance, example UAV delivery services may include ground charging stations, referred to herein as "charging hubs", distributed throughout an area served by a group of UAVs. Further, each charging station may include ground equipment operable to communicate with UAVs, and with a backend server (e.g., control systems for the group), such that the charging station ground equipment can receive battery state information from UAVs and relay this information to a central control system for the group, which in turn can use the battery state information, expected demand data, and possibly other information, to determine a more efficient (e.g., lower cost) way to charge UAVs in the group, while still meeting the demand for UAV services. The central control system can then send instructions for each UAV to the charging station where the UAV is located (or where the UAV is expected to arrive next), so that the charging station can adjust the charging rate used to charge the UAV's battery system.

Figure 4:
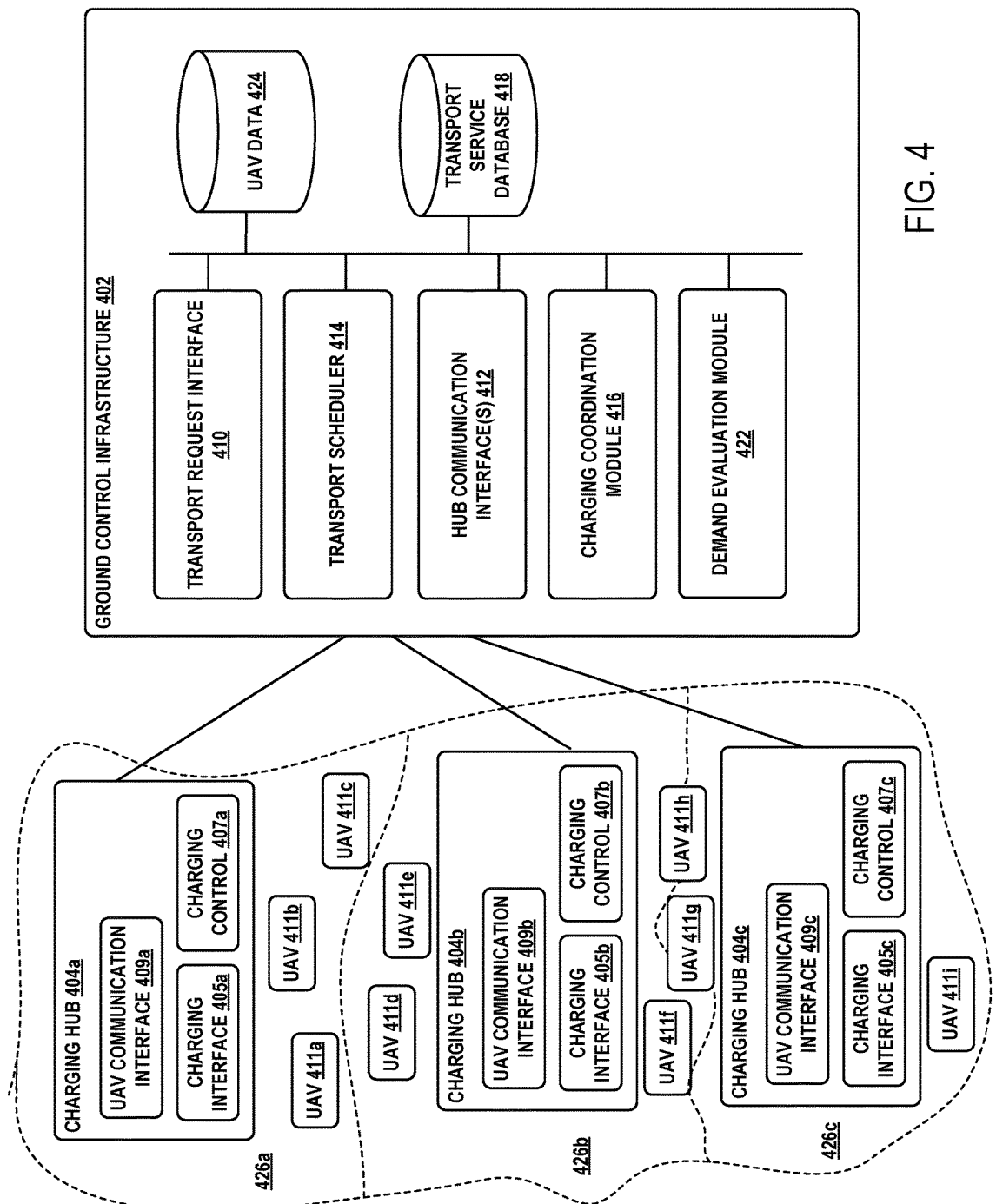
FIG. 4 is a block diagram illustrating ground control infrastructure for a plurality of UAVs, according to example embodiments.

FIG. 4 is a block diagram illustrating exemplary ground control infrastructure 402 for a plurality of UAVs (e.g., a group or fleet of UAVs). In some embodiments, ground control infrastructure 402 may be implemented as part of the computer serving system(s) that provide central dispatch system 310 and/or one or more local dispatch systems 312 as described in reference to FIG. 3. In other embodiments, ground control infrastructure 402, or portions thereof, may be implemented in separate computer system(s) that are communicatively coupled to a central dispatch system 310 and/or one or more local dispatch systems 312. Other configurations for ground control infrastructure 402 are also possible.

Ground control infrastructure 402 includes a transport request interface 410, a hub communication interface 412, a transport scheduler 414, and a charging coordination module 416. The transport request interface 410 may function to receive transport requests (e.g., orders for items to be delivered by the UAV delivery system). Transport requests and/or information relating thereto (e.g., order information and status) may then be stored in a transport service database 418.

As shown, ground control infrastructure 402 may be in communication with one or more of charging hubs 404a to 404ca. The charging hubs 404a to 404c may be geographically distributed at various locations throughout the area served by the fleet of UAVs. For example, a charging hub 404a to 404c may implemented as part of or in association with a deployment system 314 or multiple co-located deployment systems 314 (and perhaps also with a co-located local dispatch system 312). Of course, other arrangements for charging hubs within a UAV deployment system are also possible.

Ground control infrastructure 402 includes one or more hub communication interfaces 412 for communicating with charging hubs 404a to 404c. A hub communication interface 412 may be operable to send information and instructions to a charging hub 404a to 404c; e.g., charging instructions for UAVs at the hub, demand data for a geographic served by the hub, order/transport data for a geographic served by the hub, and/or flight schedules and/or instructions for UAVs departing from and/or arriving at the hub during an upcoming time period, among other possibilities. A hub communication interface 412 may also be operable to receive messages from a charging hub 404a to 404c; e.g., requests for information and/or instruction, data related to UAVs located at the hub, and data, reports and/or requests received from UAVs located at the hub, among other possibilities. Correspondingly, each charging hub 404a to 404c can include a communication interface for sending and receiving such communication to and from ground control infrastructure 402. Further, communications between a hub 404a to 404c and ground control infrastructure 402 may be conducted via a wired link, a wireless link, or a combination thereof, and could be conducted using various types of wired and/or wireless data communication protocols.

Ground control infrastructure 402 may include or have access to UAV data 424 for a group of UAVs 411a to 411i. UAV data 424 can include current, past, and/or future (e.g., predicted) state information for the individual UAVs in the group. In example embodiments, UAV data 424 includes battery state information for individual UAVs in the group. This battery state information may include a current state of charge, past battery usage and re-charging data, expected remaining useful life for a UAV' battery or batteries, and/or battery information such as a battery type, model number, serial number, and/or manufacturer, among other possibilities. UAV data 424 can also include other types of information related to individual UAVs in the group.

Ground control infrastructure 402 also includes a charging coordination module 416 and a demand evaluation module 422. The charging coordination module 416 and the demand evaluation module 422 may be each be implemented separately, as standalone hardware (e.g., on its own network-connected server system) with separate software, firmware, processor(s), memory, I/O port(s), network interface(s), and/or other components, which are operable to provide the functionality described herein. In other arrangements, charging coordination module 416 and demand evaluation module 422 may be combined in the same computing system. Further, charging coordination module 416 and/or demand evaluation module 422 may be implemented as a software module or modules in a computing system that provides other functionality as well (e.g., as part of a server system including transport scheduler 414).

In a further aspect, the charging coordination module 416 has access to transport service database 418. Transport service database 418 can include information related to current item-transport requests and/or fulfillment thereof (e.g., information relating to scheduled and/or in-progress item-transport flights). For instance, transport service database 418 may account information, target-location information, source-location information, scheduling and/or flight plan information for fulfillment of the item-transport request by the UAV fleet, and/or identification of and/or information related to a specific UAV or UAVs assigned to pending or open item-transport requests, among other possibilities.

Transport service database 418 can also include historical information related to past item-transport requests and/or fulfillment thereof by the UAV fleet (and possibly other information as well). For instance, transport service database 418 may include records of past requests for item transport (e.g., past orders), such as account information, target location information, source location information, timing and/or flight data for initiation, performance and/or completion of item-transport by a UAV, and/or identification of and/or information related to the specific UAV or UAVs that were assigned to and/or performed the item-transport flight or flights corresponding to particular requests, among other possibilities.

A demand evaluation module 422 and/or another component or components of ground control infrastructure 402 may use data from transport service database 418 and/or other sources to determine demand data for UAV item-transport services. Such demand data may indicate, for a given geographic area, a desired, required, and/or predicted demand for operation of the UAVs (e.g., flight time and/or number of flights) during a current or upcoming period of time. For example, demand evaluation module 422 may divide up the entire area served by the UAV transport service provider into a number of geographic areas 426, where each geographic area 426 can be served by a particular charging hub 404a to 404c (or perhaps a combination of multiple charging hubs 404a to 404c). Demand evaluation module 422 may then determine a measure or measures of demand for item-transport service in each geographic area 426 over a certain period of time.

For instance, demand evaluation module 422 could generate demand data that indicates an average level of demand (e.g., order volume or another such metric) in a given geographic area on an hourly basis. As another specific example, demand evaluation module 422 could generate demand data that indicates an average level of demand during several time periods during the day; e.g., during morning, afternoon, evening, and night, each day of the week. Demand evaluation module 422 may additionally or alternatively determine other types of demand data related to demand for UAV item-transport services.

As noted above, ground control infrastructure 402 also includes a charging coordination module 416, which coordinates re-charging for the group of UAVs (or at least for a portion thereof). Charging coordination module 416 can be configured to receive data from other entities that are part of the ground control infrastructure 402, directly from charging hubs 402 (and/or directly from deployment system 314 and/or local dispatch system 312), directly from UAVs 406, and/or other sources. Such data may include battery state information for UAVs 411a to 411i from the group, location information for UAVs 411a to 411i (e.g., GPS coordinates, or an indication of a particular charging hub where a UAV is located), and/or demand data generated by demand evaluation module 422, among other possibilities.

In example embodiments, charging coordination module 416 is configured to use the combination of demand data (e.g., generated by demand evaluation module 422), and battery state information for the fleet of UAVs (e.g., provided by UAV data 424), in order to determine respective charge-rate profiles for UAVs in the fleet.

A charge-rate profile may indicate the rate at which a UAV battery should be charged over time. The charge rate may specify a constant current, e.g., in milliamp hours (mAh) or perhaps a constant voltage, at which the battery should be charged. Further, the charge rate profile could specify variations in charge rate over time. A charge rate profile can indicate to change the charge rate in certain ways when the battery reaches certain states of charge (SOCs). For instance, a charge rate profile could reduce the charge rate when the battery reaches 80% SOC, or could specify step-wise decreases in charge rate as the battery reaches certain SOCs, among other possibilities.

In some implementations, a charge-rate profile may express a charge rate as a "C rate," where the C rate is a normalized rate depending on the capacity of the battery cell. For example, a battery with a capacity of 690 mAh has a 1C rate of 690 mA, a 1.3C rate of 890 mA, and so on. Accordingly, a charge rate profile for a given UAV could specify variations in C rate as the UAV's battery is being charged. A charge-rate profile may take other forms, and can include other information and/or instructions, without departing from the scope of the invention.

In some embodiments, UAV charging profiles may be determined for specific UAVs, such that instructions may be sent to a charging hub 404a to 404c to charge a particular UAV or particular UAVs at a particular rate or rates. In other embodiments, charging coordination module 416 may determine charge-rate profiles that provide a general framework for charging UAVs at a given charging hub 404a to 404c, but leave it up to the charging hub to determine how to implement the framework. For example, in order to meet expected demand during a certain time period, charging coordination module 416 might determine that a charging hub should charge two UAVs at a faster charge rate, but can charge all other UAVs at the hub at a comparatively slower charge rate, without specifying any particular UAVs to be charged at the faster or slower rate. The charging hub that receives such charge-rate profiles may then determine the specific UAVs it will charge at the faster charge rate, and the specific UAVs it will charge at the slower charge rate (if more than two UAVs are being charged at the hub). Of course, many other such examples are possible.

To facilitate such functionality, each charging hub 404a to 404c includes at least one charging interface 405a to 405c, which can electrically couple to a UAV, or possibly multiple UAVs, so as to charge the UAV or UAVs coupled thereto. Further, each charging hub 404a to 404c includes a charging control module 407a to 407c, which controls the charging process for UAVs that are coupled to charging interface 405a to 405c. In an exemplary embodiment, charging control module 407a to 407c may operate according to the charge-rate profile or profiles determined by charging coordination module 416.

Additionally, each charging hub 404a to 404c includes a UAV communication interface 409a to 409c, which allows for data communications between the charging hub 404a to 404c and UAV(s) 404a to 404c that are located at or near, and/or being charged by, the charging hub 404a to 404c. The information obtained by UAV communication interface 409a to 409c may be relayed to ground control infrastructure 402 (e.g., via hub communication interface 412), and used to populate and maintain UAV data 424.

In addition or in the alternative to direct UAV communication via a UAV communication interface 409a to 409c, a charging hub 404a to 404c may indirectly communicate with a UAV 411a to 411i. For example, a UAV 411a to 411i may communicate information, requests, and/or instructions to a central control system via an LTE network and/or other data networks, and the central control system can then relay some or all of such information, requests, and/or instructions to the charging hub 404a to 404c. Correspondingly, the charging hub 404a to 404c may communicate information, requests, and/or instructions to a central control system, which the central control system can then relay to a UAV 404a to 404c on behalf of the charging hub.

V. EXEMPLARY METHODS

As noted, a control system for a fleet of UAVs, or perhaps for a subset of a UAV fleet, may utilize example methods in order to control charging for UAVs according to demand for UAV item-transport services and other factors. In particular, an exemplary method may utilize known demand (e.g., existing orders) for an upcoming time period, or a combination of known demand and predicted additional demand (e.g., existing orders and estimate of additional orders that will be placed) for the upcoming time period, to determine UAV battery power needed or desired to perform item-transport flights to meet the demand in a given geographic area. The control system may utilize such demand data for a given geographic area during a given time period, in combination with battery state information for UAVs that are available to perform item-transport flights in the given geographic area during a given time period, to determine charge-rate profiles for the UAVs that balance the need to fulfill requests for item-transport services with the desire to charge UAVs in a cost-efficient manner.

Figure 5:
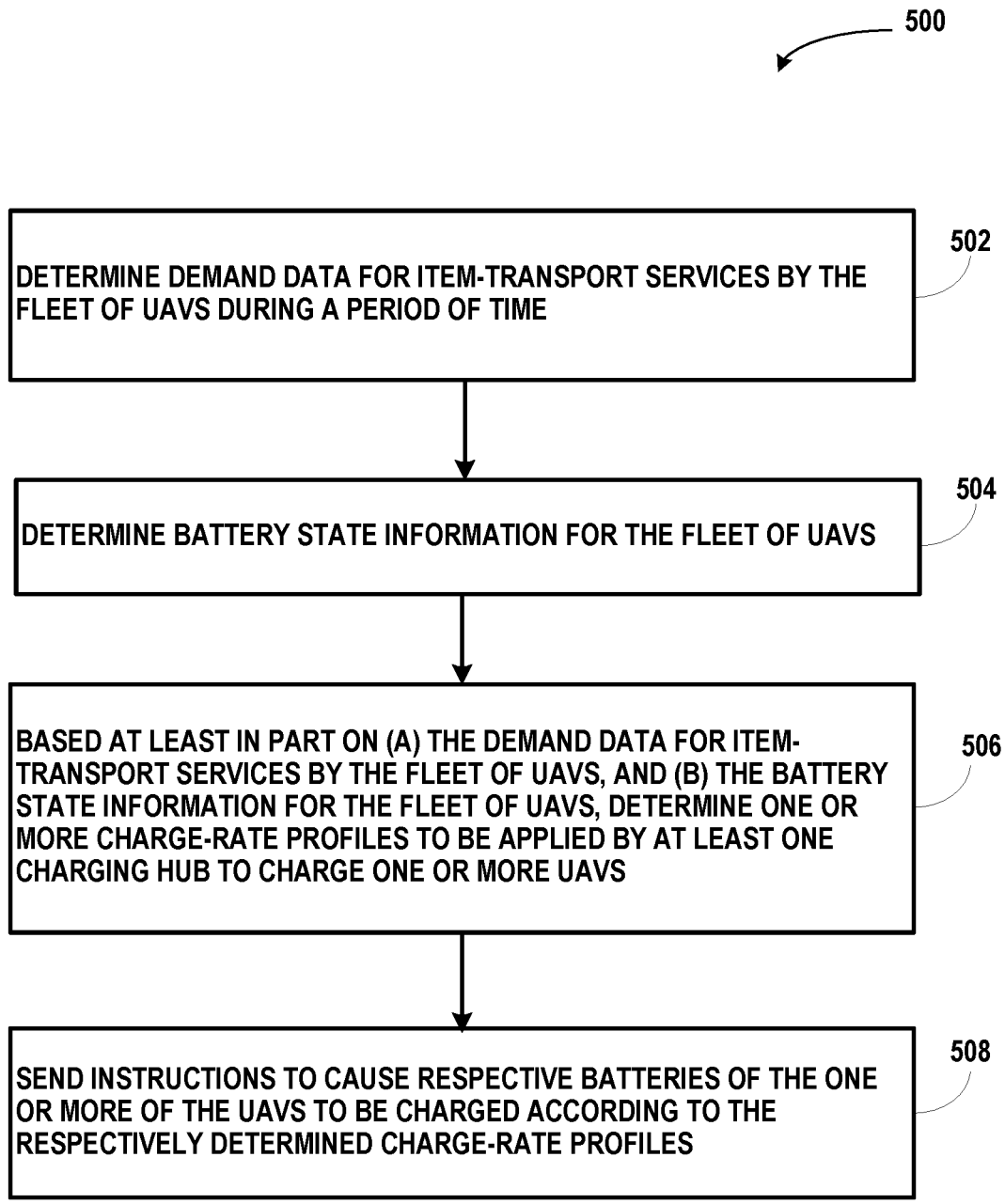
FIG. 5 is a flow chart illustrating a method, according to example embodiments.

FIG. 5 is a flow chart illustrating a method 500, according to an example embodiment. Method 500 may be performed by one or more components of the ground control infrastructure for a fleet of UAVs, such as charging coordination module 416. For ease of explanation, method 500 is described as being performed by a control system. Those skilled in the art will understand that such a control system may take the form of or be implemented as part of one or more components of the ground control infrastructure for a fleet of UAVs, such as charging coordination module 416, for example.

As shown by block 502, method 500 involves a control system for a fleet of UAVs determining UAV demand data, which indicates demand for item-transport services by the fleet of UAVs during a period of time. The control system also determines battery state information for the fleet of UAVs, as shown by block 504. In exemplary embodiments the battery state information includes individual battery state information for each of two or more of the UAVs in the fleet. Then, based at least in part on (a) the demand data for item-transport services by the fleet of UAVs, and (b) the battery state information for the fleet of UAVs, the control system determines one or more charge-rate profiles to be applied by at least one charging hub to charge one or more UAVs, as shown by block 506. Other information may also be utilized by the control system to determine charge-rate profiles for UAVs. The control system then sends instructions to cause respective batteries of the one or more of the UAVs to be charged according to the respectively determined charge-rate profiles, as shown by block 508.

A. Determining Demand Data for Item-Transport Services

At block 502, demand data may be determined using various techniques and may take on various forms. In exemplary embodiments, the demand data may indicate demand for deployment of UAVs from one or more charging hubs to pick up items from one or more source locations and transport the items to one or more target locations. In some cases, both the source location and the target locations may be remote from the charging hub(s) that serve a given geographic area. In other cases, the source location or target location for a transport request could be co-located with a UAV charging hub.

In some embodiments, the area served by a UAV fleet may be divided into a number of smaller geographic areas, such that a control system can determine demand data for item-transport services in each geographic area (or perhaps across subsets of these smaller geographic areas).

For instance, at block 502, a control system may determine a set of tasks for the UAV fleet that are expected or estimated for a certain future period of time. The expected or estimated tasks for a given period of time may take into account: (a) existing transport requests (e.g., submitted orders) that are scheduled to be fulfilled during the period of time, (b) existing transport requests that it would be desirable to fulfill (but not required) during the period of time, (c) a prediction or estimate of future (yet to be submitted) transport requests that will be scheduled for fulfillment during the period of time (e.g., orders placed between the time the demand is determined and the beginning of the period of time), and/or (d) a prediction or estimate of future (yet to be submitted) transport requests for which fulfillment is desirable (but not required) during the period of time, among other possibilities.

The control system can then determine an expected schedule of operation for the UAVs from the fleet to carry out the expected tasks. Alternatively, the control system might not determine an exact flight schedule for UAVs. Instead (or in addition to such a schedule), block 502 could involve the control system determining demand data that indicates expected or estimated operational requirements for UAVs in order to complete an expected or estimated set of tasks during the upcoming period of time.

For instance, the determined demand data may indicate: (a) a required or target number of UAVs that should be available for deployment from a given charging hub, or from a group of nearby charging hubs, at the beginning of the upcoming period of time, (b) a required or target number of UAVs that should be available for deployment from a given charging hub, or from a group of nearby charging hubs, during and/or at the end of upcoming period of time, (c) total power consumption for the geographic area (e.g., from all UAVs that operate in the geographic area) that is required or desired in order to complete the expected or estimated set of tasks in the geographic area for the upcoming period of time, (d) a per-UAV (e.g., average) power consumption that is required or desired in order for a certain number of UAVs to complete the expected or estimated set of tasks in the geographic area for the upcoming period of time, (e) total flight time (e.g., from all UAVs that operate in the geographic area) that is required or desired in order to complete the flights that are the expected or estimated in the geographic area for the upcoming period of time, and/or (f) a per-UAV (e.g., average) flight time that is required or desired in order to complete the flights that are the expected or estimated in the geographic area for the upcoming period of time, among other possibilities.

In some embodiments, demand data may be determined on a per-charging-hub basis. For instance, a central control system for a UAV fleet may determine an expected demand for UAV delivery services (e.g., a set of tasks or predicted amount of UAV operation) in a geographic area that is reachable via UAV from a given charging hub, over a certain period of time. This demand data could then be used to help determine charging rate profile(s) for use by the charging hub, or could be sent to the charging hub so that the charging hub could determine charging rate profile(s) for UAVs being charged by the charging hub.

B. Determining Battery State Information for the Fleet of UAVs

At block 504, the control system may use various techniques to determine battery state information for the fleet of UAVs. In some cases, the control system may communicate with charging hubs to determine battery state information, which the charging hubs have obtained via direct communication with and/or interaction with the UAVs to which the information pertains. Additionally or alternatively, the control system may communicate with some or all UAVs directly to determine battery state information. Other techniques are also possible.

Further, the determined battery state information may take various forms. For example, the control system may determine, for each of one or more of the UAVs, battery state information such as: a current battery level of the given UAV, a number of previous charge cycles for a battery of the given UAV, an expected number of remaining charge cycles in the useful life of the UAV's battery, and/or the remaining useful life for the battery of the UAV, among other possibilities.

C. Determining Charge-Rate Profiles

At block 506, a control system may determine charge-rate profiles for one or more UAVs from a fleet that are available to provide item-transport services in a given geographic area during an upcoming period of time (and may repeat such determination for some or all geographic areas within the larger area served by the fleet). As noted, such charge-rate profiles may be determined based on a combination of expected or estimated demand for UAV item-transport services in the geographic area during the upcoming time period, battery state information for UAVs in the fleet.

For instance, in example embodiments, when the demand data indicates a lower demand level during an upcoming time period, the control state may instruct charging hubs to apply charging profiles that generally charge UAVs at a slower charge rate (e.g., lower C rates), as compared to when the UAVs have the same or similar battery states but a higher demand level exists in the geographic area. As a specific example, a control system might apply method 500 to charge UAVs more slowly, on average, during the night than during the day, since demand for item-transport services may be lower during the night and higher during the day.

In some implementations of block 506, a control system could determine a common charge rate profile that should be used to charge all UAVs located at a given charging hub at a given point in time. A control system could also determine a common charge rate profile that should be used by a group of charging hubs (e.g., a set of neighboring hubs) to charge all UAVs located at one of the hubs in the group. In other implementations of block 506, a control system could determine charge rate profiles for individual UAVs.

In practice, the control system for the UAV fleet could use a cost function to evaluate and optimize the cost of charging individual UAVs, while still meeting the expected demand for UAV services from the fleet as a whole. To do so, the central control system could use battery state information, and perhaps other information, to determine a cost of charging a UAV. For instance, in implementations where the demand data indicates a set of tasks for the UAV fleet in a given geographic area during a given period of time, block 506 could thus involve a control system determining a cost value corresponding to charging one or more UAVS in order to perform the set of tasks during the period of time.

More generally, the central control system may use a cost function $C(UAV_i)$ that indicates cost of charging a $UAV_i$ to a certain power level, at a certain charge rate. As an example, the following charging cost function $C(UAV_i)$ could be used to determine the cost of charging a given $UAV_i$ to reach a certain power level (e.g., a certain SOC) at a certain time:

$$C(UAV_i) = C(electricity_i) + C(lifetime\_reduction_i)$$

The foregoing cost function $C(UAV_i)$ takes into account the cost of electricity $C(electricity_i)$ to charge $UAV_i$ and/or other costs incurred by the charging process. To calculate $C(electricity_i)$, the control system could determine the instantaneous cost of electricity (e.g., LMP pricing from local utility node), and can then compare this to historical and/or future energy pricing models. As such, $C(UAV_i)$ may take into account the fact that charging during periods of peak electrical demand can be more expensive than charging at other times. Other techniques for calculating $C(electricity_i)$ area also possible.

The above cost function $C(UAV_i)$ also takes into account and assigns a cost to the reduction in battery lifetime $C(lifetime\_reduction_i)$ expected to result from charging $UAV_i$ from an initial state to a certain level at a certain C rate. To determine $C(lifetime\_reduction_i)$ for a given $UAV_i$, a control system may assign a cost to the portion of a battery's useful lifetime that is consumed by charging to a certain level using a certain charge rate or charge-rate profile, based on costs associated with replacing a battery sooner, the cost of the battery itself, and/or other factors. Accordingly, $C(lifetime\_reduction_i)$ may be a function of the charge rate C and the target charge level X (and possibly other variables as well), such that the value of $C(lifetime\_reduction_i)$ will tend to increase as the charge rate C increases (given a certain target charge level X).

At block 506, a control system may take demand for item-transport services into account by determining required and/or desired tasks for a given period of time, and use such tasks as constraints when applying the cost function to reduce costs of charging. For instance, the control system may determine operational requirements for the fleet (e.g., the number of UAVs and/or power consumption estimates) in order to meet demand for item-transport service in a given geographic area and/or at a given charging hub, during an upcoming period of time. The control system may then use such demand-driven operational requirements as constraints, when applying a cost function to determine how to charge UAVs in the fleet. More specifically, the control system may apply a cost function $C(UAV_i)$ to determine which UAVs to charge at which rates, such that the fleet of UAVs (or a perhaps a subset of UAVs available at a particular charging hub or group of hubs) can meet the operational requirements for the expected demand at a reduced or minimized cost.

As part of this process, the control system may evaluate cost for the fleet (or at least a subset) of UAVs as a whole, in order to determine how individual UAVs should be charged. By doing so, a control system may take into account the fact that a fleet of UAVs could collectively carry out a set of tasks in a number of different ways, some of which may be less costly on the whole. In particular, the set of charge-rate profiles that results in the fleet (or a subset of the fleet) performing a set of item-transport tasks at the lowest cost, might involve a given UAV being assigned a charge-rate profile with a higher associated cost than it would be assigned if it was being evaluated individually, so that the cumulative cost across all UAVs is lower.

Due to various factors, simply determining the optimal charge rate for each UAV, in isolation, could result in less than optimal charging by the fleet as a whole. Accordingly, a control system may implement example methods to consider charging cost and/or demand across the fleet as a whole (or a subset thereof), when determining the charge-rate profiles for individual UAVs.

For instance, a control system could use example methods to implement a policy to spread costs across the fleet in a more even manner. As an example, consider the scenario where demand-driven operational requirements for a group of UAVs dictate that some, but not all, of the UAVs be charged using a charge-rate profile having a higher-than-optimal cost, in order to meet demand for item-transport services during a given period of time. The cost function, or more specifically, the comparative values of $C(lifetime\_reduction_i)$, may indicate that certain UAVs are more costly to charge to a certain power level at a certain C rate. This might occur due to differences in past usage, current remaining useful life, current charge level, and so on. Accordingly, the control system could determine the cost for various available UAVs to be charged to a desired level at a desired time (e.g., in time to carry out the required and/or desired item-transport tasks), and select the UAVs that can be charged in this way at a lower cost, such that the remaining UAVs in the group can charge in a more cost-efficient manner.

Further, by considering demand and cost across a group of UAVs available to meet the demand, the control system for a UAV fleet may account for the fact that two (or more) item-transport flights could be fulfilled by a single UAV during the one longer round-trip flight, or could be fulfilled be two (or more) UAVs performing two shorter round-trip flights. More specifically, in some cases, the cost of charging one UAV to perform the longer round-trip flight may be less than charging two UAVs to perform the two shorter round-trip flights. And, in other cases, it may be more cost efficient to charge two UAVs to perform the two shorter round-trip flights. Further, the cost to charge the same amount may vary from UAV to UAV, depending on factors such as the UAVs individual charge histories, current states of charge, etc.

In another aspect, some implementations of block 506 could utilize a charging cost function $C(UAV_i)$ that takes demand for UAV item-transport services into account directly by, e.g., assigning a cost to the downtime required to charge a UAV at a given location (e.g., at a certain charging hub). More specifically, when a UAV is charging and is not in flight, there may be an opportunity cost corresponding to the item-transport services the UAV could be providing if it were not charging. Accordingly, a cost may be assigned to the amount of downtime required to charge a UAV. The cost of downtime $C(downtime_i)$ for charging a given $UAV_i$ may therefore be calculated by a function of the amount of demand for UAV item transport in the geographic area or areas where the given UAV can provide item-transport services, along with other factors such as battery state information for the given UAV and other UAVs that are available to provide item-transport services in the same geographic area or areas as the given UAV. Other techniques for calculating the cost of downtime $C(downtime_i)$ are also possible.

In such embodiments, a charging cost function for a $UAV_i$ may be determined as follows:

$$C(UAV_i)=C(electricity_i)+C(lifetime\_reduction_i)+C(downtime_i)$$

To determine $C(downtime_i)$ for a given $UAV_i$, a central control system may first determine a fleet-wide (or charging-station-wide) cost per unit of downtime $c_{dt}$ (e.g., measured in cost/min or cost/sec) at an expected demand level. The cost per unit of downtime $c_{dt}$ may be calculated based on the amount of operational time needed from UAVs, during a given period of time, in order to meet the demand for UAV services during the period of time. As such, the cost per unit of downtime $c_{dt}$ will typically be greater during peak demand periods, and vice versa. As such, $C(downtime_i)$ may be a function of the cost per unit of downtime $c_{dt}$ at the expected demand level, and the amount of time to charge to a target charge level X at a certain charge rate.

In the foregoing, the cost of downtime $C(downtime_i)$ and the cost of reduction to battery lifetime $C(lifetime\_reduction_i)$ are both functions of the charge rate C and the desired charge level. However, $C(downtime_i)$ tends to increase as the charge rate C decreases and charging takes longer, whereas $C(lifetime\_reduction_i)$ tends to decrease as the charge rate C decreases. By taking both these costs into account when determining the cost of charging a given UAV, optimizing $C(UAV_i)$ can help to balance the need to reduce downtime and increase operational time, with the desire to extend the useful lifetime of UAV batteries.

In a variation on method 500, block 506 could be carried out in whole or in part at an individual charging hub, rather than by a central control system. For example, a control system could generate demand data that provides a target SOC framework for a group of UAVs, which is not tied to any particular UAVs, and provide this framework to a given charging hub. For instance, a central control system might determine that in order to meet demand for item-transport services during a certain time period, in the geographic area served by the charging hub, the charging hub should coordinate its UAV charging such that ten UAVs are at 90% SOC, five UAV are at 70% SOC, and three UAVs are at 50% SOC at the beginning of the time period. Accordingly, the central control system may indicate this SOC framework to the charging hub. The charging hub may then evaluate battery state information for the UAVs, and apply a charging cost function for UAVs that dock at the charging hub, to determine how to charge the particular UAVs so as to meet the SOC framework indicated by the central control system.

It should be understood that the techniques for determining a cost of charging a given described herein are provided as examples, and are not intended to be limiting. Other factors may be considered, in addition or in the alternative to those described herein, without departing from the scope of the invention.

D. Implementing the Determined Charge-Rate Profiles

As noted above, block 508 involves the control system sending instructions to cause respective batteries of the one or more of the UAVs to be charged according to the charge-rate profiles determined at block 506. Each charging hub may then implement the appropriate charge-rate profile(s) to charge UAV(s) located at the charging hub.

In embodiments where block 506 is implemented by a central control system, block 508 may involve the central control system sending one or more charge-rate profiles to one or more charging hubs. In such an embodiment, the central control system may indicate which UAV each charge-rate profile should be applied to (e.g., by associating each charge-rate profile with a unique UAV identification number or code). Further, if there is a chance that a given UAV could be located at any one of multiple charging hubs during the time period specified by its charge-rate profile, the central control system could communicate the charge-rate profile for the given UAV to all of these charging hubs.

In embodiments, where block 506 is implemented in whole or in part by a charging hub, then block 508 may simply involve a computing system of the charging hub controlling the charging interface(s) according to the determined charge-rate profiles. Furthermore, other implementations of block 508, and variations on the implementations described herein, are possible.

VI. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Further, it should be understood that various entities and components of systems may include computing systems to provide the functionality described herein. Specifically, entities such as a control system for UAVs, a charging hub, a UAV, among others, can include one or more processors configured to execute computer-readable program instructions that are stored in non-transitory data storage to provide the functionality of such entities described herein.

In this context, a processor 208 may be a general-purpose processor or a special purpose processor (e.g., digital signal processors, application specific integrated circuits, etc.). Further, data storage may include or take the form of one or more computer-readable storage media. Such computer-readable storage media can include volatile and/or non-volatile storage components, such as optical, magnetic, organic or other memory or disc storage, and can be separate from, or integrated in whole or in part with at least one of the one or more processors. Further, data storage could be implemented using a single physical device (e.g., one optical, magnetic, organic or other memory or disc storage unit), or using two or more physical devices.

What is claimed is:

1. A method comprising:
   determining, by a control system for a plurality of unmanned aerial vehicles (UAVs) that are available to provide item-transport service a first geographic area, UAV demand data indicating demand for item-transport services by the plurality of UAVs during a period of time in the first geographic area, wherein the demand data indicates demand for deployment of UAVs from a charging hub to pick up items from one or more source locations and transport the items to one or more target locations in the first geographic area;
   determining, by the control system, battery state information for the plurality of UAVs that are available to provide item-transport service in the first geographic area, wherein the battery state information is based at least in part on individual battery state information for each of two or more of the UAVs;
   based at least in part on (a) the demand data for item-transport services by the plurality of UAVs, and (b) the battery state information for the plurality of UAVs, determining respective charge-rate profiles for one or more of the UAVs; and
   sending instructions to cause respective batteries of the one or more of the UAVs to be charged according to the respectively determined charge-rate profiles.

2. The method of claim 1, wherein the demand data indicates the demand during a given period of time.

3. The method of claim 1, wherein the plurality of UAVs serve the first geographic area, wherein a plurality of UAV charging hubs are distributed throughout the first geographic area, and wherein the demand data is indicative of demand on per-charging-hub basis.

4. The method of claim 1, wherein determining the demand data comprises:
   determining expected tasks for the plurality of UAVs during the period of time; and
   determining group-wide power requirements corresponding to the expected tasks.

5. The method of claim 1, wherein determining the one or more charge-rate profiles comprises:
   determining expected tasks for the plurality of UAVs during the period of time; and
   determining a schedule of operation for the plurality of UAVs to collectively carry out the expected tasks.

6. The method of claim 1, wherein determining the battery state information for the plurality of UAVs comprises:
   for each of one or more of the UAVs, determining one or more of the following information items: a current battery level of the UAV, a number of charge cycles experienced by a battery of the UAV, an expected number of remaining charge cycles for the battery of the UAV, and a remaining useful life for the battery of the UAV.

7. The method of claim 1, wherein the demand data comprises power-consumption data for a set of UAV item-transport tasks, and wherein determining the charge-rate profiles comprises:
   for each UAV from a subset of the plurality of UAVs, applying a cost function to evaluate cost of charging the UAV such that the UAV can perform one or more tasks from the set of tasks during the period of time; and
   based on the cost evaluation for the subset of UAVs, selecting a set of one or more of the UAVs that are collectively capable of performing the set of tasks during the period of time.

8. The method of claim 1, wherein determining the demand data comprises:
   when the demand data indicates a lower demand level during the time period, then assigning a lower charge-rate to one or more selected UAVs from the plurality of UAVs; and
   when the demand data indicates a higher demand level during the time period, then assigning a higher charge-rate to the one or more selected UAVs.

9. The method of claim 1, further comprising:
   based at least in part on the demand data, determining a cost per unit of UAV downtime during the period of time.

10. The method of claim 9, wherein determining the cost per unit of UAV downtime comprises:
    determining a set of tasks for performance by the plurality of UAVs during the period of time;
    determining a cumulative power consumption requirement for the plurality of UAVs to carry out the set of tasks; and
    based at least in part on the cumulative power consumption requirement, determining a cost per unit of UAV downtime during the period of time, wherein time spent by a given UAV results in downtime for the given UAV.

11. A control system for a plurality of unmanned aerial vehicles (UAVs) comprising:
    at least one communication interface for communicating with a plurality of charging hubs, wherein each charging hub is capable of charging one or more of a plurality of UAVs that are available to provide item-transport service a first geographic area; and
    a computing system operable to:
      determine UAV demand data indicating demand for item-transport services by the plurality of UAVs in the first geographic area, wherein the demand data indicates demand for deployment of UAVs from a charging hub to pick up items from one or more source locations and transport the items to one or more target locations in the first geographic area;
      determine battery state information for the plurality of UAVs that are available to provide item-transport service in the first geographic area, wherein the battery state information is based at least in part on individual battery state information for each of two or more of the UAVs;

based at least in part on (a) the demand data for item-transport services by the plurality of UAVs, and (b) the battery state information for the plurality of UAVs, determine a respective charge-rate profile for each of one or more of the UAVs; and send, via the at least one communication interface, instructions to at least one charging hub to cause respective batteries of the one or more of the UAVs to be charged according to the respectively determined charge-rate profiles.

12. The control system of claim 11, wherein the demand data indicates the demand during a given period of time.

13. The control system of claim 11, wherein a plurality of UAV charging hubs are distributed throughout the first geographic area, and wherein the demand data is indicative of demand on per-charging-hub basis.

14. The control system of claim 11, wherein, in order to determine the demand data the computing system is configured to:

determine expected tasks for the plurality of UAVs during a period of time; and determine fleet-wide power requirements, for the plurality of UAVs, corresponding to the expected tasks.

15. The control system of claim 11, wherein, in order to determine the demand data the computing system is configured to:

determine expected tasks for the plurality of UAVs during a period of time; and determine a schedule of operation for one or more of the plurality of UAVs to collectively carry out the expected tasks.

16. The control system of claim 11, wherein, in order to determine the battery state information for the plurality of UAVs, the computing system is configured to:

for each of one or more of the UAVs, determine one or more of the following information items: a current battery level of the UAV, a number of charge cycles experienced by a battery of the UAV, an expected number of remaining charge cycles for the battery of the UAV, and a remaining useful life for the battery of the UAV.

17. The control system of claim 11:

wherein the demand data comprises power-consumption data for a set of UAV item-transport tasks, and wherein, in order to determine the charge-rate profiles, the computing system is configured to:

for each UAV from the plurality of UAVs, apply a cost function to evaluate cost of charging the UAV such that the UAV can perform one or more tasks from the set of tasks during a period of time; and based on the cost evaluations for the plurality of UAVs, select a set of one or more of the plurality UAVs that are collectively capable of performing the set of tasks during the period of time.

18. The control system of claim 11, wherein, in order to determine the charge-rate profiles, the computing system is configured to:

when the demand data indicates a lower demand level during a time period, then assign a lower charge-rate to one or more selected UAVs from the plurality of UAVs; and when the demand data indicates a higher demand level during the time period, then assign a higher charge-rate to the one or more selected UAVs.

* * * * *